Figure 1:
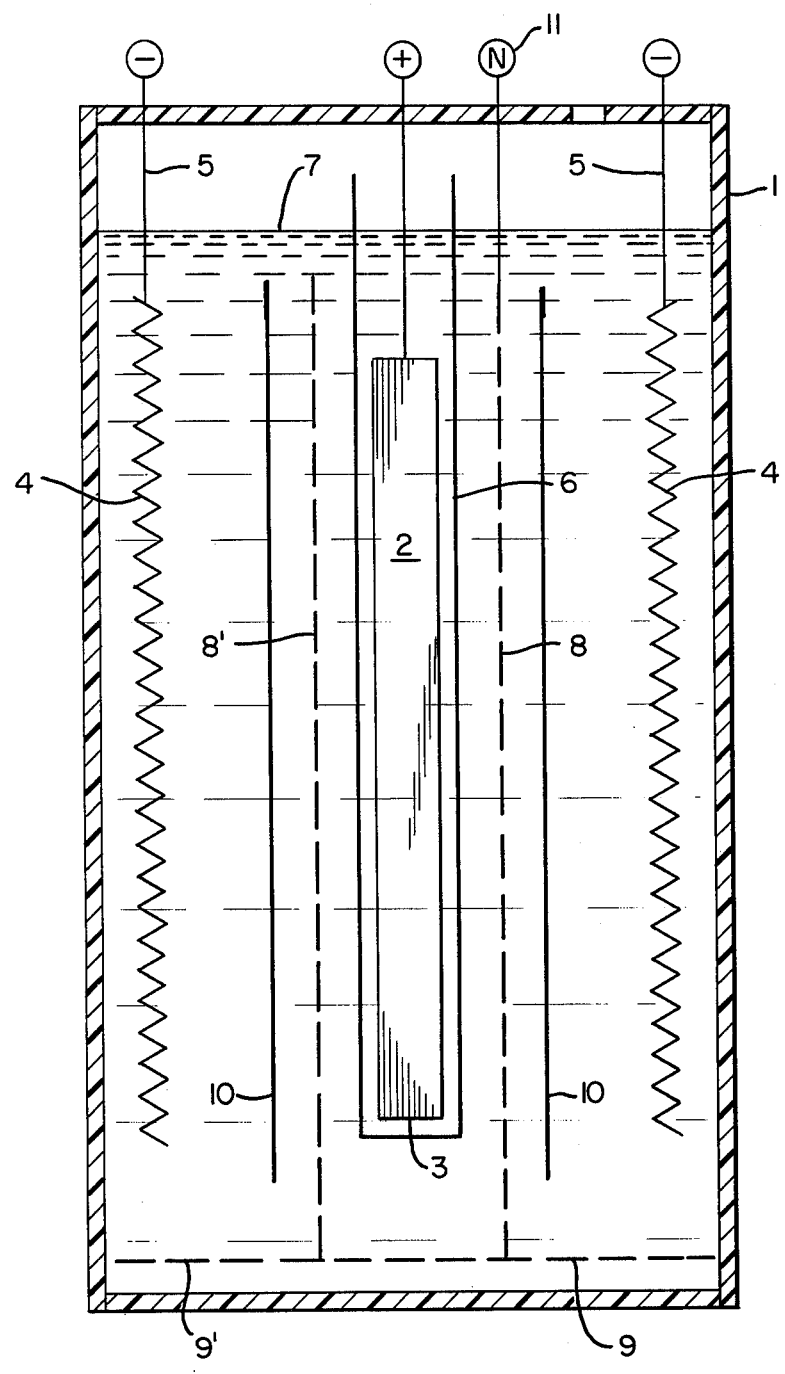

United States Patent [19]

Benczúr-Urmössy et al.

[11] 4,039,729
[45] Aug. 2, 1977

[54] RECHARGEABLE GALVANIC CELL WITH ZINC ELECTRODE AND AUXILIARY STRUCTURE

[75] Inventors: Gábor Benczúr-Ürmössy, Stuttgart; Klaus von Benda, Kemnat; Friedrich Haschka, Stuttgart, all of Germany

[73] Assignee: Deutsche Automobilgesellschaft mBh, Firma, Germany

[21] Appl. No.: 575,268

[22] Filed: May 7, 1975

[30] Foreign Application Priority Data

May 9, 1974 Germany .............................. 2422577

[51] Int. Cl.² .............................................. H01M 6/04
[52] U.S. Cl. ..................................... 429/206; 429/229
[58] Field of Search ...................... 136/6 GC, 30, 179; 429/206, 229-231, 57-60

[56] References Cited

U.S. PATENT DOCUMENTS

| | | | |
|---|---|---|---|
| 2,903,497 | 9/1959 | Comanor | 136/30 X |
| 3,069,486 | 12/1962 | Solomon et al. | 136/30 |
| 3,096,215 | 7/1963 | Voss et al. | 136/6 GC |
| 3,117,033 | 1/1964 | Bachmann | 136/6 GC X |
| 3,410,726 | 11/1968 | Hainel | 136/6 GC |
| 3,502,504 | 3/1970 | White | 136/6 GC |
| 3,540,935 | 11/1970 | Keating et al. | 136/30 X |
| 3,658,591 | 4/1972 | Fukuda et al. | 136/6 GC |
| 3,769,088 | 10/1973 | Seiger et al. | 136/6 GC X |
| 3,876,470 | 4/1975 | McBreen | 136/30 |

*Primary Examiner*—C. F. LeFevour
*Attorney, Agent, or Firm*—Craig & Antonelli

[57] ABSTRACT

A rechargeable galvanic cell has a housing containing at least one negative zinc electrode, at least one positive metal oxide or oxygen electrode, an alkaline electrolyte, at least one electrically conductive auxiliary structure exhibiting low hydrogen overvoltage, for cathodic hydrogen evolution which is not conductively connected with the electrodes, and at least one microporous separator for separating said auxiliary structure from at least one of said electrodes. The structure simultaneously acts as an auxiliary electrode to effect afterdischarging of the zinc electrode when connected thereto and as a dendrite barrier to prevent short-circuiting between the negative and positive electrodes during operation of said cell and is arranged between one positive electrode and one negative electrode.

44 Claims, 7 Drawing Figures

RECHARGEABLE GALVANIC CELL WITH ZINC ELECTRODE AND AUXILIARY STRUCTURE

This invention relates to a rechargeable galvanic cell with at least one negative, completely soluble zinc electrode, (i.e. an anode) at least one positive metal oxide or oxygen electrode (i.e. a cathode), an alkaline electrolyte, as well as at least one electrically conductive auxiliary structure of low gas overvoltage, which is not permanently connected conductively with the electrodes for cathodic hydrogen evolution.

In primary cells and in alkaline accumulators or storage batteries, zinc is preferred as the anode material due to its satisfactory current capability its low price, and because of the high cell voltages attainable. In spite of these advantages, the alkaline accumulators or storage batteries containing zinc anodes have not as yet found general acceptance. The reason for this resides in the deficient rechargeability of the zinc anode. Due to the high solubility of the oxidation product (ZnO or $Zn(OH)_2$, respectively) in alkaline electrolytes, operational disturbances occur in zinc anodes of the second kind, even if the amount of electrolyte in the cell is kept at a minimum. The zinc is not deposited during charging at the location where it has been oxidized during discharging. Furthermore, the zinc accumulates preferably in the lower part of the cell, causing a bulge formation. These effects are known as "shape change." Since zinc furthermore tends to cause dendritic deposition to a high degree, this soon leads, in conjunction with the other effects, to a short circuit with the positive electrode and thus to failure of the cell.

If the positive electrode is a nickel oxide electrode, the cell must be overcharged due to the fact that the charging efficiency of this electrode lies below 100%, in other words, hydrogen must be developed at the zinc electrode. This, however, occurs only at the time when there is only a small amount of unreduced zinc left. The dangers of dendritic growth and short-circuit formation are then particularly great.

Thus, nickel oxide/zinc cells suffer from the aforementioned disadvantages to an especially high degree, although for reasons of expenses, nickel oxide cathodes would be particularly preferred.

All of the above deficiencies also occur, even to an increased extent, if the zinc electrode is operated as an electrode of the first kind, i.e. if the oxidation product of the zinc electrode is completely dissolved in the electrolyte, and especially if the cell is deep discharged, i.e. if the active mass of the electrode is almost completely exploited.

However, such cells with soluble zinc electrodes offer considerable technical advantages because of the low manufacturing costs for the zinc electrode, the high (degree of utilization) of the active mass, and the satisfactory current capability.

Therefore, it is an object of the present invention to provide a rechargeable alkaline cell with a soluble zinc electrode which solves the operational problems inherent in the zinc electrode so effectively that a lifetime of many hundred cycles is attained with deep discharging.

As heretofore indicated, the problems of dendrite formation and shape change must, above all, be solved. Furthermore, the problem of balancing the charging efficiencies is especially difficult in electrodes of the first kind. This balancing process takes place in the conventional cells with electrodes of the second kind by water electrolysis during charging, i.e. hydrogen evolution on the negative electrode and oxygen production on the positive electrode. A hydrogen production on a zinc electrode of the first kind, however, is connected with such a minor zinc ion concentration in the electrolyte that the zinc deposition before and during the hydrogen evolution takes place in a pronouncedly dendritic form, which was to be avoided due to the danger of a short circuit.

Many attempts have become known to prevent the formation of dendritic zinc or to avoid the damaging consequences thereof. Thus, certain success has been achieved with a pulsating charging current, electrolyte additives, special separators, and electrolyte circulation. A complete avoidance of short circuits between a zinc electrode and an opposite electrode over several hundred cycles with complete exploitation of the cell capacity has not been accomplished thereby.

However, a method has become known recently for the avoidance of short circuits of the zinc electrode with the opposite electrode which offers a high degree of reliability. The method resides in arranging, between the zinc electrode and the opposite electrode, e.g. a nickel oxide electrode, a porous auxiliary structure of metallic conductivity with a small hydrogen overvoltage; this structure being electrically insulated from the zinc electrode and from the opposite electrode. Zinc dendrites growing in the direction of the opposite electrode contact the auxiliary structure before reaching the opposite electrode and are dissolved under the liberation of hydrogen.

Although the auxiliary structure effectively prevents short circuits, it does not ensure by itself a flawless operation of the cell over longer periods of time, because the shape change is not eliminated and the charging efficiency can be subject to strong fluctuations.

The thus-posed problem has been solved in accordance with the invention by providing that (1) the auxiliary structure is segregated from the positive and/or the negative electrode by at least one — preferably microporous — separator and serves simultaneously as an auxiliary electrode for afterdischarging the zinc electrode as well as dendrite barrier; and (2) the auxiliary structure is arranged between, respectively, a positive electrode and a negative electrode so that it is close to the positive electrode but electrically insulated while an interspace is provided as an electrolyte chamber between the auxiliary structure and the current collector grid of the negative electrode, wherein the zinc deposition takes place during the charging of the cell and wherein, during discharging, the oxidation products of the negative electrode are completely dissolved.

The process for operating this cell resides in that the auxiliary structure (arranged between, respectively each zinc electrode and each positive electrode), which is metallically conductive and is not constantly conductively connected with either the zinc electrode or the positive electrode, is utilized as an auxiliary electrode for an afterdischarge of the zinc electrode and that the afterdischarge takes place by short-circuiting the zinc electrode with the auxiliary electrode after the normal discharging (i.e. useful) discharge). The afterdischarge can take place after each cycle or after several cycles, depending on the operating conditions, especially depending on the intensity of discharge. If a battery is normally discharged only partially, an afterdischarge will be conducted only after several cycles. In any event, such afterdischarging should be effected if a drop in the capacity of the cell is noticed.

The interspace between the auxiliary electrode and the current collector of the negative electrode is dimensioned so that it offers sufficient space for the amount of zinc to be deposited. Because of varying capacities per unit area of the usable positive electrodes and because of different charging methods, no fixed value can be indicated for the interspace. However, when using nickel oxide electrodes, interspacings of from 0.5 to 8 mm. and when using air electrodes, interspacings of 1–5 mm. are preferred between the current-discharge structure of the zinc electrode and the auxiliary electrode. The respectively optimum distances can be determined by a person skilled in the art cognizant of the above disclosure by means of a few routine experiments. The distance between the current collector of the zinc electrode and the adjacent separator may be determined by insulating electrolyte permeable elements which can also serve for the fixation of the electrodes, such as webbings, ribs, corrugated elements or dimensionally stable nettings made of synthetic resin or another insulating material. Preferred spacers are pins extending perpendicular to the plane of the electrodes and which are fixed to the cell wall and/or to the current collector grid of the zinc electrode.

The auxiliary electrode fulfills a dual task in accordance with the present invention; on the one hand, the prevention of short circuits during charging and, on the other hand, the removal of residual zinc from the current-discharge structure of the zinc electrode after the useful discharge by means of afterdischarge. Residual zinc remains on the current conductor, i.e. current-discharge element, of the zinc electrode after useful discharge by passivation under very high current densities; due to local nonuniformities in the distribution and utilization of the active masses; and/or by a higher charging efficiency of the zinc electrode. The afterdischarge takes place voluntarily without an external current source because of the small hydrogen overvoltage of the auxilary electrode and produces a quantity of hydrogen at the auxiliary electrode equivalent to the amount of zinc being disolved, until the reaction stops due to zinc consumption. The velocity of the reaction and/or the duration of the afterdischarge can be influenced by the resistance of the short-circuiting bar or wire; the cutoff can be time-, current- or voltage controlled. Normally, the afterdischarge is terminated when the cell voltage is about 0.25 – 0.3 volts lower than before the afterdischarge.

By means of the auxiliary electrode and its mode of operation, the gravest sources of error which heretofore have limited the lifetime of cells with rechargeable zinc electrodes have been eliminated and/or cirumvented. The afterdischarge takes care that, at the beginning of the following charging step, the zinc electrode is present in an exactly reproducible starting condition, namely as a zinc-free current-discharge structure (i.e. free of zinc deposits), as it is also the case when the cell is assembled; thus, each cycle forms the active mass of the zinc electrode entirely new from the electrolyte solution. Thereby, all difficulties resulting from the past function of the electrode and from fluctuating operating conditions and which ordinarily are cumulative over the number of cycles, but particularly a shape change increasing with the number of cycles, are overcome. Besides, a complete adaptation of varying charging efficiencies of positive and negative electrodes is thus achieved, independently of the fact how much hydrogen has already been liberated at the zinc electrode or at the auxiliary electrode during charging, since the sum total of the amounts of current converted into hydrogen production during the charging and aftercharging corresponds, in the final analysis, to the amount of current converted into oxygen production at the positive electrode. The use of the auxiliary electrode for afterdischarge thus permits a mode of operation wherein the quantity of zinc dissolved in the electrolyte is converted, by the charging step, into zinc only to such an extent that a considerable depletion of the electrolye in dissolved zinc and with this a strong increase of dendrite (crystallite) is avoided. The latter case exists if the zinc electrode, as normally required, must evolve gas to compensate for the charging efficiencies. On the other hand, the cell can also be overcharged without danger, because the auxiliary electrode in its function as a dendrite barrier prevents short circuits and only the charging efficiency drops during overloading.

By the hydrogen formation taking place during the afterdischarge, the electrolyte is agitated. Thereby, differences in the electrolyte concentration are leveled out and consequently the uniformity of the zinc deposition during the subsequent charging is promoted and thus a shape change is suppressed. According to the invention, this effect can be improved by extending part of the area of the auxiliary electrode on the bottom of the cell to a position underneath the zinc electrode. Furthermore, this configuration of the auxiliary electrode accomplishes the dissolution of zinc particles which may fall off the zinc electrode, since the zinc particles are converted, under hydrogen evolution, into zincate ions. Thus, irreversible capacity losses by shedding are made impossible.

The charging conditions are to be chosen so that the space available for zinc deposition between the current-discharge structure of the zinc electrode and the auxiliary electrode is filled as completely and as uniformly as possible with zinc. It is known that the uniformity of the zinc deposition is promoted by electrolyte convection; and aid in this connection is the aforementioned evolution of hydrogen at the auxiliary electrode. Especially dense and uniform depositions can be produced, if necessary, by a force circulation of the electrolyte means of a pump; however, in this connection, the necesary technical expenditure must be weighed against its usefulness, depending on the purpose for which the unit is employed.

Even without forced circulation, the uniformity of the zinc deposition is satisfactory if the zinc is deposited in mossy form with current densities which can vary, depending on the electrolyte concentration, between 5 and 50 mA/cm$^2$, and if a microporous separator is arranged between the zinc electrode and the auxiliary electrode so that the separator is in close contact with the auxiliary electrode. Since, however, mossy zinc has a high space requirement and since, for reasons of space and weight a zinc deposition is desireable which is not only uniform but also compact, a favourable compromise can be reached according to the present invention by conducting the zinc deposition with varying current strenghts, i.e. amperages. In the simplest case, this is a two-stage charging process wherein the largest part of the zinc is deposited in compact form with a high charging current density corresponding to a charge of about 1–2 hours, and the remainder is deposited as moss with a lower current density corresponding to a charge of about 5 hours.

There is a beneficial effect in interrupting charging of the cell(s) once or several times for at least 20 minutes, in order to allow diffusional levelling of zincate concentration gradients in the electrolyte.

After the charging, the electrolyte level of the cell has risen somewhat; after discharging, this level drops. The housing must, therefore, be dimensioned so that there is a sufficient spacing between the highest electrolyte level and the upper rime of the cell. Since the top edges of the plates, due to the electrolyte level fluctuations, cannot be extended in as close a proximity to the lid of the cell as in other systems, relatively long paths result for the current-discharge lugs. Therefore, the terminals or intercell connectors of at least one type of electrode are advantageously extended through the housing laterally in parallel to the electrode plane.

All conventional positive electrodes suitable for alkaline electrolytes can be utilized in the cell of the present invention; thus, for example, mercury oxide, manganese oxide, or silver oxide electrodes are suitable. However, especially preferred are nickel oxide electrodes and air or oxygen electrodes.

Suitable electrolytes are alkali hydroxide solutions of high concentration; ordinarily, these are KOH or NaOH solutions in concentrations of 4 to 14 M, or mixtures of these types of alkaline solutions.

To obtain high capacities in relationship to the weight, the zincate ion concentration in the electrolyte is of decisive importance, since the proportion of the electrolyte in the total weight of the cells according to this invention is higher than in ordinary systems. It is therefore advantageous to combine the electrolyte with additives which make it possible to attain a substantially higher zincate ion concentration in the electrolyte than can be obtained by dissolving zinc oxide in a pure alkaline solution. Especially proved to be advantageous are additives of electrolyte-soluble silicates and phosphates, e.g. $K_2SiO_3$, $Na_2SiO_3$, $K_2Si_2O_5$ and Graham's salt. Extremely stable supersaturated solutions can thus be produced with zincate concentrations of more than 300 g./l. A concentration of the additive of below 0.05 M has no decisive effects, and above 0.7 M, no further increase in solubility can be observed.

The current-discharge structure of the zinc electrode can consist of copper, iron, nickel, silver, or alloys of these metals, as customary in the alkaline battery technology. Preferred is cadmiumplated copper in the form of plates, nets, or expanded metal. The cross-sectional area of the zinc electrode is to be at least as large as that of the positive electrode.

In order to enchance coherance and adherance of the zinc deposit, especially with mossy depositions, it has proved beneficial to arrange in the interelectrode space provided for zinc deposition an additional current collector. This additional current collector has no current lead of its own and is spaced from the pole connected current collector of the zinc electrode. As during charge the interspace between both collectors fills up with zinc the additional collector becomes part of the zinc electrode. Shape and material of the additional collector may be the same as those of the pole connected first collector.

The auxiliary electrode consists of a porous, electrically conductive material and is made preferably of netting, perforated plate, or screen plate of a thickness of 0.05 - 0.15 mm. with round, rectangular, or hexagonal openings of a width of 0.05 - 1 mm. The open area is to range between 20 and 60%. The material can be copper, iron, or nickel; however, nickel or nickel-plated copper, or nickel-plated iron is also useful. The electrode is coated with an electrocatalyst for hydrogen evolution. There are known many catalysts of this type such as platinum or palladium in finely divided form, Raney nickel, titanium-nickel alloys (e.g. 35 weight% to 85 weight% Ni.) or X-ray amorphous nickel boride. A preferred range of thickness for the coating is 0,1 - 20 $\mu$.

Figure 2:
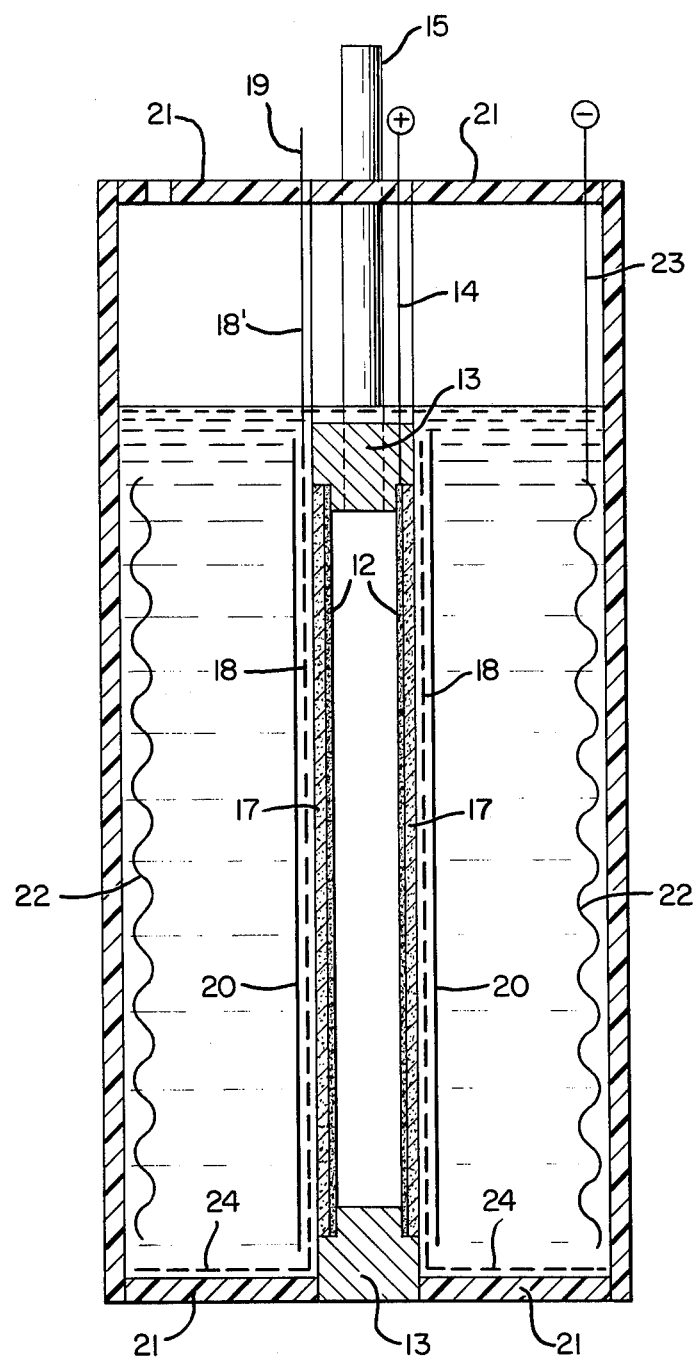
Figure 3:
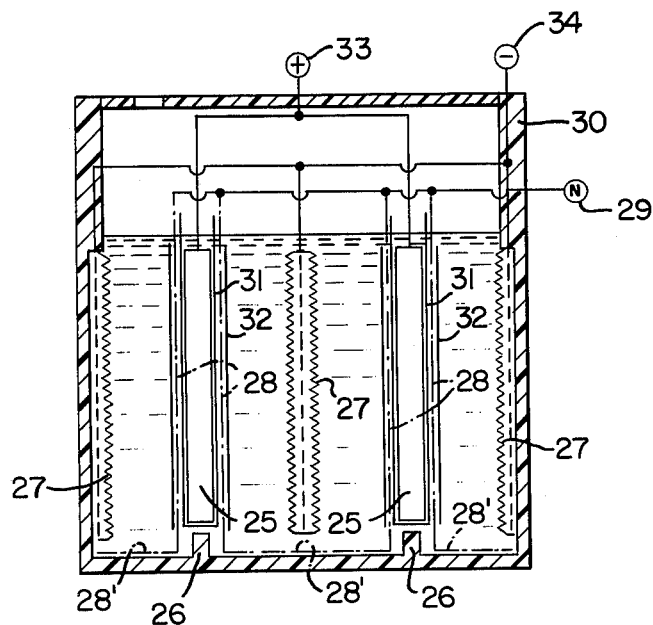

The invention will be further understood from the following detailed description of the specific embodiments and with reference to the accompanying drawing wherein:

FIG. 1 schematically shows in a side cross sectional view the construction of a nickel oxide/zinc cell wherein the positive nickel oxide electrode is arranged in the middle between two zinc electrodes;

FIG. 2 schematically shows a side cross sectional view of a zinc/air cell with a reversible air electrode;

FIG. 3 shows schematically a side cross sectional view of the arrangement and connection of several electrode pairs in a cell (in cells containing a plurality of zinc electrodes and positive electrodes, these are combined as usual into plate stacks each of which has a common pole; the same procedure is followed for the auxiliary electrodes); Thus FIG. 3 shows a cell containing a plate set consisting of 2 positive nickel oxide electrodes 25, resting on protuberances 26, and a plate set of three negative zinc electrodes 27. The positive electrodes are closely surrounded by auxiliary electrodes 28 with lateral bottom parts 28'. The auxiliary electrodes have a common pole 29 and are separated from the positive electrodes by separators 31 and from the interelectrode space available for zinc deposition by separators 32. The positive and negative plate sets each have a common pole 33 and 34, respectively.

Figure 4A:
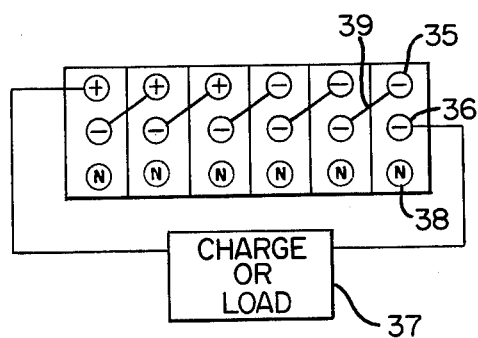
Figure 4B:
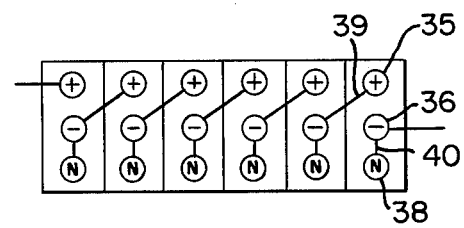

FIGS. 4a and 4b show schematically the arrangement. of several series-connected individual cell poles during charging/discharging and during the afterdischarging step; when several cells are series-connected fo form a battery, the afterdischarge is conducted by estabilishing for each cell individually a short circuit between the negative pole and the pole of the auxiliary electrode; Thus FIGS. 4a an 4b show a battery made up of six single cells which are series-connected by means of intercell connectors 39, each cell having positive poles 35 and negative poles 36 as well as auxiliary electrode poles 38. FIG. 4ashows the battery during the charge and discharge modes, 37 representing a charger or a load, respectively. FIG. 4b shows the same battery during the afterdischarge, the terminals of the battery free and the auxiliary electrode pole and negative pole of each cell being short-circuited by an intracell connector 40, without, however, connecting auxiliary electrode poles or negative poles of different cells, which would cause damage to the cell.

Figure 5:
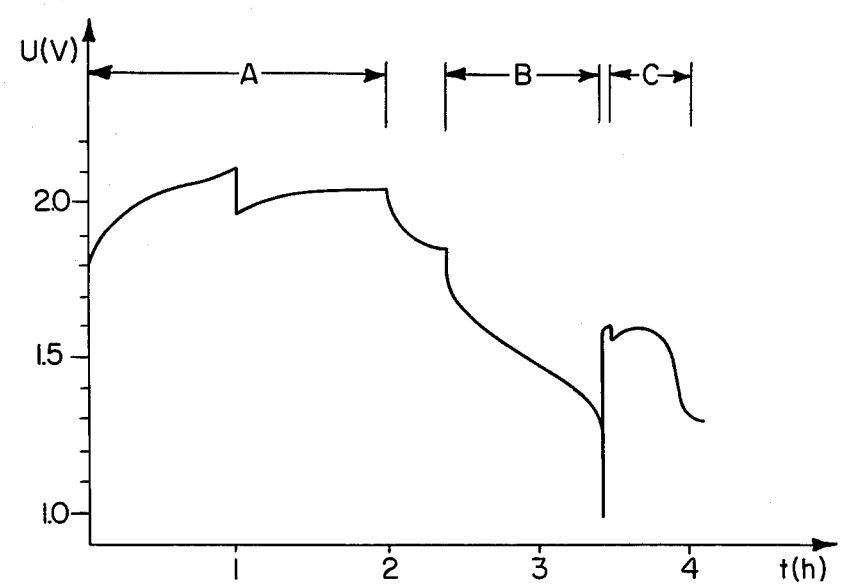
Figure 6:
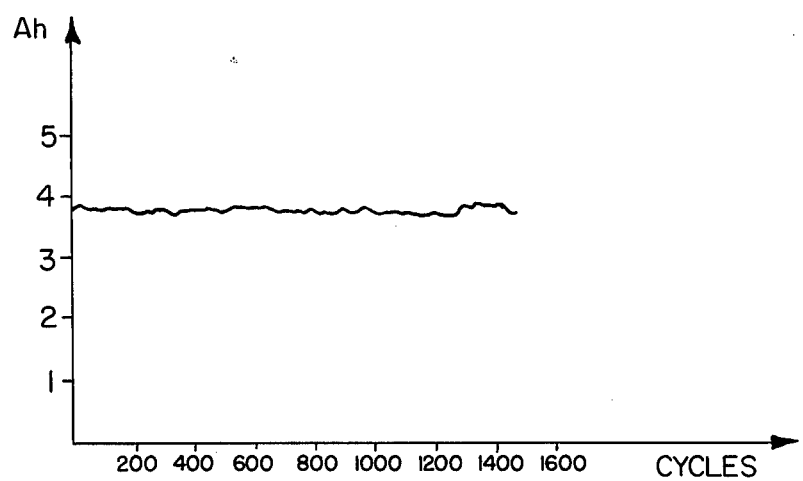

FIG. 5 shows the current-voltage characteristic of the nickel oxide/zinc cell described in Example 1 over a complete cycle, including afterdischarge; and FIG. 6 shows the dependence of the capacity on the number of cycles for such a nickel oxide/zinc cell.

The figures of the drawings and the examples set forth below will further explain the invention.

EXAMPLE 1

FIG. 1 illustrates the structure of a cell according to one embodiment of the invention. In a housing 1 of alkali-resistant plastic, e.g. a synthetic resin, a nickel oxide electrode 2 with a square cross-section, having a thickness of 4 mm. and an edge length of 140 mm., is arranged in the center of the cell so that its lower edge 3 is 5 mm. above the bottom of the cell. Two zinc electrodes 4, with a current collector grid made of cadmium-plated expanded copper metal, are disposed on the opposite cell walls. Their lower edges are likewise 5 mm. above the bottom of the cell. The current-discharge lugs 5 (i.e. leads to the cell poles) arranged above the top edges of the electrode assembly of the zinc electrode are insulated by means of a synthetic resin layer coating to avoid a zinc deposition which is undesirable at that location. The nickel oxide electrode 2 arranged in the center is surrounded by a microporous separator 6 made of polypropylene and having pore widths or diameters of 0.1 $\mu$ to form a pocket or interspace thereabout. The pocket is extended past the top edge of the nickel oxide eletrode 2 and above the eletrolyte level 7. The nickel oxide electrode 2 and the separator 6 are surrounded by the auxiliary electrode means comprised of vertical elements 8 and 8'. The auxiliary electrode means may also be referred to as an arrangement of two conductively connected auxiliary electrodes 8 and 8'. The lower horizontal parts or elements 9,9' of the auxiliary electrode means are extended to underneath the current-discharge structures of the zinc electrodes 4 to dissolve any zinc particles which may fall off and to take care of improved convection of the electrolyte during the gassing of the auxiliary electrode. The auxiliary electrode consists of nickel netting having a mesh width of 0.12 mm. and is coated with a layer of X-ray amorphous nickel boride of a thickness of 5 $\mu$. as the electrocatalyst to promote hydrogen evolution. By means of a current lead the auxiliary electrode is connected to the third pole 11 of the cell during afterdischarging. The vertical parts or elements of the auxiliary electrode means are surrounded by a further microporous separator 10 of polypropylene, arranged in close contact therewith and having a pore or diameter of 0.1 $\mu$. The distance of this separator or of the auxiliary electrode to the zinc current-discharge structures is 4 mm. and is maintained by corrugated separators made of polystyrene which are not shown in the drawing. A space having a height of 50 mm. is provided between the lid of the cell and the top edges of the electrodes. The nickel oxide electrode 2, the auxiliary electrode means including elements 8, 8', and the separator 10 are located in all operating conditions of the cell with their top edges below the electrolyte level 7'. The electrolyte 7 contains 8 moles/liter of KOH and 150 grams/liter of dissolved zinc with an addition of 0.1 mole/liter of $K_2SiO_3$. The cell contains 260 ml. of electrolyte; the filling height is 165 mm.

FIG. 5 shows the curve of the cell voltage of the cell shown in FIG. 1 over a full cycle; the charging was conducted with 20 A for 60 minutes and then with 5 A for 60 minutes (section A). Up to the cutoff voltage of 1.0 V, discharging can be carried out for 60 minutes with 20 A (section B). Five minutes after discharging, an open cell voltage of 1.63 V is measured. Afterdischarging of the zinc electrode is effected by short-circuiting the negative pole of the cell with the third pole, i.e. pole 11, of the cell (section C). Residual zinc is dissolved under liberation of hydrogen. After 1 hour, the cell voltage has dropped to 1.3 V. The short circuit is terminated and the cell is recharged. After 600 cycles with the above-indicated mode of charging and afterdischarging subsequently to each cycle, and with a discharge amperage of 20 A, the discharging time has not changed.

In FIG. 6, the capacity of an analogously constructed cell is plotted over a number of cycles.

EXAMPLE 2

This example concerns an embodiment of a cell constructed as described in Example 1, with the following changes.

The auxiliary electrode means consists of steel and is fashioned as a perforated plate having a thickness of 0.1 mm. and a hole diameter of 0.3 mm., the open area being 40%. The catalyst layer consists of a Raney nickel coat 15 $\mu$. thick. Silver-plated (10 $\mu$.) copper netting having a mesh width of 1 mm. and a wire thickness of 0.35 mm. serves as the current collector grid of the zinc electrodes. Starting with the top edge of the copper netting, the current discharge lug made of copper sheet is covered with a coating of a electrolyte-resistant synthetic resin, i.e. polyamide. The electorlyte made up of 7 M KOH with an addition of 0.05 M sodium metaphosphate contains 130 g. of Zn per liter. The spacings between the current collector of the zinc eletrodes and the separator in contact with the auxiliary electrode structure are 5.5 mm. A charging at a constant current of 10 A is effected within 2.5 hours. Discharging can be carried out with 20 A for 1 hour until the cutoff voltage of 1.0 V has been reached. The afterdischarge step takes place after each cycle within about 30 minutes. A marked drop in capacity is not observed wven after 1,200 cycles.

EXAMPLE 3

This example deals with the operation of a cell as described in Example 1, but with the following changes.

A nickel oxide electrode having a thickness of 2 mm. is used as the positive electrode, having the dimensions of 140 X 140 mm. Those parts of the auxiliary electrode surrounding the vertical narrow sides of the nickel oxide eletrode are made of unperforated nickel sheet having a thickness of 0.1 mm. The part of the auxiliary electrode resting on the bottom of the cell consists of a porous nickel plate. All parts of the auxiliary electrode including the porous nickel plate are catalysed as in Example 1. The prefabricated pack of nickel oxide electrode, separator pocket, auxiliary electrode, and second separator envelope is inserted in grooves provided for this purpose in the sidewalls of the cell. The lateral broadened portions of the auxiliary electrode, i.e. the porous nickel plates, rest on the bottom of the cell and the nickel oxide electrode is not in contact with the cell bottom. The nickel oxide electrode rests on two protuberances of the cell housing material arranged on the cell bottom, so that the bottom edge of the nickel oxide electrode, just as that of the zinc electrode discharge leads, has a distance of 5 mm. from the porous nickel plates at the bottom. The current-discharge structures of the zinc electrodes are likewise inserted in grooves. Fixed by the grooves, spaces are produced extending parallel to the surfaces of the electrodes; these spaces are defined by the zinc current collector grids and the separator layers between the latter and the auxiliary electrode and have a thickness of 2 mm. Into these spaces is charged 100 ml. of electrolyte made up of 10 M of KOH with an addition of 0.3 M of $K_2SiO_3$ and a zinc concentration of 250 g. of Zn per liter. The cell is charged with 10 A for 1 hour and with 3.4 A for 2 hours. By means of a discharge current of 10 A, 12 Ah can be withdrawn. Each discharge is followed by an afterdischarge. After 850 cycles, no loss of capacity had as yet occurred.

EXAMPLE 4

The cell in this example contains the cell components described in Example 1, wherein the assembly was effected in a frame structure and the following changes were made in addition.

The nickel oxide electrode which is enveloped by a microporous separator pocket was inserted in lateral grooves of a U-shaped frame manufactured from the material of the cell housing. Thereupon, the auxiliary electrode structures with a prefabricated laterally widened portions, which are to rest on the bottom of the cell, were glued, on both sides of the frame in parallel to the electrode surface. The auxiliary electrode structures are catalysed by platinum black. A separator layer was glued on both sides to this pack, so that the bottom portions of the auxiliary structures were not covered. As the next layer, respectively one frame of cell housing material was provided on both sides, in order to create the electrolyte chambers necessary for the zinc deposition. Finally, the end plates of the cell housing with already fixed zinc current-discharge structures and insulated current-discharge lugs were glued on electrolyte-tight.

Respectively, two inlet and outlet openings were provided in the sidewalls of the cell, in parallel to the electrode surfaces which were connected to a pump to circulate the electrolyte. During the charging, carried out within 1 hour with 30 A, the electrolyte was thus circulated by pumping with 0.5 l./min. The discharging, without electrolyte circulation, took place with 20 A amperage. After each discharge step, an afterdischarge was carried out. After 300 cycles, no drop in capacity had as yet occurred.

EXAMPLE 5

FIG. 2 illustrates the construction of a Zn/oxygen cell.

Two oxygen electrodes 12 made of platinum-catalysed nickel sinter foil and of a size of 140 X 140 mm. are glued to a frame 13. The two electrodes are conductively connected (this connection is not illustrated) and have a common discharge line or conductor 14 made of a nickel sheet, constituting the positive pole of the cell. The electrodes are rendered partially hydrophobic by teflon emulsion. Supply and discharge of oxygen or air are effected via respectively one feed pipe 15 and discharge pipe (not shown). After providing a layer 17 of asbestos on each of the outsides of the electrodes, two nickel nets 18 are glued to the frame. The nets have a nickel boride coat and conductors 18' of nickel leading to the third pole 19 of the cell. Respectively one microporous separator 20 is in close contact with the nickel nets.

Two U-shaped frame 21 form the space intended for the zinc deposition. Two expanded copper screens 22 having a size of 140 X 140 mm. are attached to the cell walls; these screens are conductively connected with each other (this connection is not shown). The common current-discharge lug 23 of these screens leads to the negative pole of the cell. The nickel nettings 18 are widened into lateral parts 24 in contact with the cell bottom and extending underneath the expanded screens 22. The cell housing extends 50 mm higher than the frame 13. The cell is filled with 350 ml. of electrolyte containing dissolved therein 8 M KOH, 0.15 M $K_2SiO_3$, and 200g./l. of zinc. The cell is charged at a constant voltage of 2.15 V. During discharge, air freed of carbon dioxide is passed in fivefold excess to the air electrodes.

After discharging, an afterdischarge step was conducted in each instance by connecting the pole 8 to the negative pole. Within a number of 300 cycles, capacity and cell voltage remained constant.

The examples set forth that the auxiliary electrode has on its surface a coating of a electrocatalyst for the liberation of hydrogen. This provides the required, low hydrogen overvoltage and is a particularly preferred embodiment of the auxiliary electrode. It will be understood that such electrocatalysts are well known to those skilled in the battery art and are additionally exemplified by the following materials: platinised tungsten bronces, cobalt, phosphides and nickel phosphides.

While the novel embodiments of the invention have been described, it will be understood that various omissions, modificatins and changes in these embodiments may be made by one skilled in the art without departing from the spirit and scope of the invention.

What is claimed is;

1. A rechargeable galvanic cell comprising a housing containing at least one negative zinc electrode, said zinc electrode including zinc deposited on a current collector, at least one positive metal oxide or oxygen electrode, an alkaline electrolyte, at least one electrically conductive foraminous auxiliary structure exhibiting low hydrogen overvoltage for cathodic hydrogen evolution at least one microporous separator for separating said auxiliary structure from at least one of said electrodes, and current lead means for conductively connecting said auxiliary structure to said at least one zinc electrode to effect afterdischarge of said at least one zinc electrode, said current lead means being disconnected from said zinc electrode during charging and discharging in the normal operation of said cell and said current lead means being connected with said auxiliary structure and said at least one zinc electrode after normal discharge occuring during normal operation of said cell to effect afterdischage of said zinc electrode whereby said auxiliary structure serves as an auxiliary electrode to effect afterdischarging of the zinc electrode connected thereto by said current lead means and as a dendrite barrier to prevent short-circuiting between the negative and positive electrodes during normal operation of said cell said auxiliary structure also being arranged between each positive electrode and each negative electrode so that said auxiliary structure is in close, but electrically insulated, relationship with the positive electrode, while an interspace is provided as an electrolyte chamber between the auxiliary structure and the current collector of the negative zinc electrode, whereby zinc deposition takes place in said interspace during the charging of the cell and, during discharging, the oxidation products of the negative electrode are completely dissolved and whereby the zinc of the at least one zinc electrode is completely dissolved during afterdischarge so that a fully renewed zinc deposition may be built upon the current collector during charging of said cell.

2. A cell according to claim 1, wherein the spacing between the current collector of the zinc electrode and the auxiliary structure is 0.5 to 8 mm. if the positive electrode is a nickel oxide electrode, and 1 - 15 mm., if the positive electrode is an oxygen or air electrode.

3. A cell according to claim 1, wherein the auxiliary structure is shaped to define a pocket wherein there are disposed, respectively, one or two positive electrodes.

4. A cell according to claim 1, wherein said cell contains more negative zinc electrodes than positive metal oxide electrodes.

5. A cell according to claim 1, wherein the electrolyte level in the discharged condition of the cell is located 5–20 mm. above the top edges of the electrodes.

6. A cell according to claim 1, wherein the electrolyte level, in the discharged condition of the cell, is 5–10 mm. above the top edge of the separators present between the auxiliary structure and the current collector of the zinc electrode.

7. A cell according to claim 1, wherein at least one type of said electrodes has a terminal or intercell connector that extends laterally in parallel with the electrode plane through the cell wall so that the pole or connector is sealed off from the electrolyte.

8. A cell according to claim 1, wherein the spacing between the current collector of the zinc electrode and the adjacent separator which defines the thickness of the space provided for the zinc deposition, is determined by insulating electrolyte-permeable elements which can also serve simultaneously for the fixation of the electrodes.

9. A cell according to claim 1, wherein an electrochemically inert metallic structure having coarse pores is arranged between each auxiliary structure and the current collector of the adjacent zinc electrode, this metallic structure having no contact with the zinc electrode in the completely discharged condition of the cell, but being contacted, during the charging of the cell, by the deposited zinc and thus becoming part of the zinc electrode.

10. A cell according to claim 1, wherein the current collector of the negative electrode is in the form of an expanded grid, netting, perforated sheet, or plate.

11. A cell according to claim 1, wherein the positive electrode is a nickel oxide, silver oxide, manganese oxide, or mercury oxide electrode.

12. A cell according to claim 1, wherein the oxygen electrodes also serve as the charging electrodes.

13. A cell according to claim 1, wherein the auxiliary structure includes a carrier material which consists of nickel, iron, steel, or copper.

14. A cell according to claim 1, wherein the auxiliary structure includes a carrier material coated with an electrocatalyst for the cathodic hydrogen evolution.

15. A cell according to claim 1 wherein the auxiliary electrode is formed from metal nettings or pressure-welded grids with a mesh width of 0.05 – 1 mm. and preferably 0.1 – 0.3 mm.

16. A cell according to claim 1, wherein the auxiliary electrode is formed from metal wire netting in which the wires are crimped, in the direction of the current flow of the after-discharge, to a lesser degree or with less frequency than in other directions, or in which the wires extend linearly in this direction.

17. A cell according to claim 1, wherein the auxiliary electrode is formed from metal wire netting in which the wires have a larger diameter in the direction of the current flow of the afterdischarge than in other directions.

18. A cell according to claim 1, wherein the auxiliary electrode is formed from a perforated metla sheet or screen plate having a thickness of 0.05 – 0.15 mm. with round, rectangular, or hexagonal holes having average diameters of 0.05 – 1 mm. and preferably 0.1 – 0.3 mm.

19. A cell according to claim 1, wherein the auxiliary electrode has an open area and/or passage area of 20 – 60% in the partial space of the cell delimited by the adjacent negative and positive electrodes.

20. A cell according to claim 1, wherein a portion of the auxiliary electode resting on the cell bottom is formed from porous sintered components.

21. A cell according to claim 1, wherein the electrolyte contains 4 – 14 moles per liter of potassium hydroxide and/or sodium hydroxide.

22. A cell according to claim 1, wherein the separator between the auxiliary electrode and the zinc electrode is microporous and has pore widths of $<1 \, \mu m$.

23. A cell according to claim 1, wherein the current lead means includes connecting means connecting the auxiliary electrode to the zinc electrode positioned within said housing.

24. A cell according to claim 1, wherein the connecting means current lead means includes connecting the auxiliary electrode to the zinc electrode positioned outside of said housing.

25. A cell according to claim 1, wherein the current collector of said zinc electrode is in the form of a grid.

26. A cell according to claim 3, wherein each auxiliary structure has a portion extending underneath at least one neighboring zinc electrode, and said portion forms approximately a right angle with a remaining portion of the auxiliary structure and is not surrounded by separators.

27. A cell according to claim 26, wherein individual separators and/or the auxiliary structures extend more into the vicinity of the electrolyte level of the cell than the positive and negative electrodes or even reach above the electrolyte level.

28. A cell according to claim 26, wherein the current collector of the zinc electrodes ae spaced with their lower edge by 2 – 15 mm. from the cell bottom and/or from the portion of the auxiliary structure disposed therebeneath.

29. A cell according to claim 27, wherein all auxiliary structures are permanently electrically conductively connected with one another and with a third pole of the cell containing a plurality of auxiliary structures, negative electrodes, and positive electrodes.

30. A cell according to claim 6, wherein the upper termination of the housing is 30 – 70 mm. above the electrolyte level, in the discharged condition of the cell.

31. A cell according to claim 30, wherein a current-discharge lug for said zinc electrode is insulated so that said lug is sealed off from the electrolyte starting with the top edge of the current collector of each zinc electrode.

32. A cell according to claim 8, wherein said elements are made in the shape of webs, ribs, corrugated components, or dimensionally stable network from a synthetic resin or another insulating material.

33. A cell according to claim 8, wherein said elements are pins extending perpendicular to the plane of the electrodes and are fixed to the cell wall and/or to the current collector grid of the zinc electrode.

34. A cell according to claim 10, wherein the current collector of the negative electrode consists of Cu, a Cu alloy, Ag, Ni, Fe, or steel.

35. A cell according to claim 10, wherein the current collector of the negative electrode is a foraminous element that is amalgamated, cadmium-plated, silver-plated, tin-plated, nickel-plated, or zinc-plated.

36. A cell according to claim 35, wherein the foraminous element is made of copper, nickel or steel.

37. A cell according to claim 11, wherein the zinc electrodes and the positive electrodes are fashioned to be bipolar when the cells are connected in series.

38. A cell acording to claim 14, wherein Raney nickel, nickel boride, cobalt boride, finely divided platinum, or palladium or a titanium-nickel alloy is utilized as the electrocatalyst.

39. A cell according to claim 18, wherein the auxiliary electrode is formed of partially or entirely imperforate sheet metal over the areas which are not located in the partial space of the cell delimited by the adjacent negative and positive electrodes.

40. A cell according to claim 21, wherein the electrolyte is supersaturated with respect to zinc oxide or zinc hydroxide.

41. A cell according to claim 40, wherein the electrolyte contains 0.05 - 0.7 mole per liter of soluble silicates of phosphates, preferably of the metals Li, Na, or K.

42. A rechargeable galvanic cell comprising a housing containing at least one negative zinc electrode, said zinc electrode comprising zinc deposited on a current collector, an alkaline electrolyte, at least one electrically conductive auxiliary structure exhibiting low hydrogen overvoltage for cathodic hydrogen evolution, means conductively connecting said auxiliary structure to said at least one negative zinc electrode to effect after discharge of said zinc electrode and at least one microporous separator for separating said auxiliary structure from at least one of said electrodes; said auxiliary structure acting as an auxiliary electrode to effect afterdischarging of the zinc electrode when connected thereto by said means and when said means is not connected with said zinc electrode, said auxiliary structure serving as a dendrite barrier to prevent short-circuiting between the negative and positive electrodes during normal opertion of said cell said auxiliary structure being arranged between a positive electrode and a negative electrode in close, but electrically insulated, relationship with the positive electrode and said means including circuit means external of said electrolyte for connecting said auxiliary structure to said negative electrode during the afterdischarging.

43. A cell according to claim 42, wherein said positive electrode is a metal oxide electrode.

44. A cell according to claim 43, wherein said negative electrode is an oxygen electrode.

* * * * *